US009462400B2

(12) United States Patent
Zhang et al.

(10) Patent No.: US 9,462,400 B2
(45) Date of Patent: Oct. 4, 2016

(54) PERIODOGRAM-BASED WIRELESS SIGNAL DETECTION METHOD (75) Inventors: Taotao Zhang, Anhui (CN); Wenyi Zhang, Anhui (CN); Huanhuan Sun, Anhui (CN)

(73) Assignee: University of Science and Technology of China, Hefei, Anhui (CN)

( * ) Notice: Subject to any disclaimer, the term of this patent is extended or adjusted under 35 U.S.C. 154(b) by 108 days.

(21) Appl. No.: 14/363,995

(22) PCT Filed: May 22, 2012

(86) PCT No.: PCT/CN2012/075877
§ 371 (c)(1),
(2), (4) Date: Oct. 31, 2014

(87) PCT Pub. No.: WO2013/097407
PCT Pub. Date: Jul. 4, 2013

(65) Prior Publication Data
US 2015/0049875 A1 Feb. 19, 2015

(30) Foreign Application Priority Data
Dec. 31, 2011 (CN) .......................... 2011 1 0459578

(51) Int. Cl.
*H04B 17/354* (2015.01)
*H04B 17/336* (2015.01)
(Continued)

(52) U.S. Cl.
CPC .......... *H04R 29/004* (2013.01); *H04B 17/336* (2015.01); *H04B 17/345* (2015.01); *H04R 2420/07* (2013.01)

(58) Field of Classification Search
CPC ............ H04R 29/004; H04R 2420/07; H04B 17/345; H04B 17/226
See application file for complete search history.

(56) References Cited

U.S. PATENT DOCUMENTS

| 5,844,983 A | 12/1998 | Lilja | |
|---|---|---|---|
| 2005/0030433 A1* | 2/2005 | Suzuki | H03J 5/244 348/731 |

(Continued)

FOREIGN PATENT DOCUMENTS

| CN | 1270735 A | 10/2000 |
|---|---|---|
| CN | 1787078 A | 6/2006 |
| CN | 101536328 A | 9/2009 |

OTHER PUBLICATIONS

Zeng et al., Spectrum Sensing Algorithms for Cognitive Radio Based on Statistical Covariances, May 2009, IEEE Transactionson Vehicle Transactions, p. 1805-1806.*

(Continued)

*Primary Examiner* — Sonia Gay
(74) *Attorney, Agent, or Firm* — Workman Nydegger (57) ABSTRACT

A periodogram-based wireless microphone signal detection method, which solves the problem of incapability of distinguishing wireless microphone signal from narrow-band interference, includes: acquiring a time-domain digital signal for detection through antenna module, RF front-end module, ADC module and time-domain signal preprocessing module; and performing detection of microphone signal in frequency domain, that is, calculating an average value of periodogram of M segments of the time-domain digital signal for detection, shifting the average value to obtain a shifted vector, estimating a mean and a covariance matrix of the shifted vector, locating a maximum point of the vector, and taking several points on each side of the point as a center to form an information vector; calculating a decision statistical quantity of the information vector using the decision theory, simulating or calculating a threshold in a predefined method, and deciding the signal is narrow-band interference if the decision statistical quantity is less than the threshold, otherwise the signal is wireless microphone signal.

11 Claims, 5 Drawing Sheets

(51) Int. Cl.
  *H04R 29/00*  (2006.01)
  *H04B 17/345*  (2015.01)

(56) References Cited

U.S. PATENT DOCUMENTS

| | | | | |
|---|---|---|---|---|
| 2006/0234667 | A1* | 10/2006 | Wang | G01S 19/21 |
| | | | | 455/333 |
| 2008/0112467 | A1 | 5/2008 | Shellhammer | |
| 2008/0165680 | A1* | 7/2008 | Chang | H04L 5/0062 |
| | | | | 370/230 |
| 2008/0198948 | A1* | 8/2008 | Tang | H04W 72/02 |
| | | | | 375/316 |
| 2010/0015935 | A1* | 1/2010 | Zeng | H04B 17/345 |
| | | | | 455/206 |
| 2010/0111235 | A1* | 5/2010 | Zeng | H04W 16/14 |
| | | | | 375/343 |
| 2010/0119016 | A1* | 5/2010 | Ghosh | H04L 27/2647 |
| | | | | 375/340 |
| 2010/0309317 | A1* | 12/2010 | Wu | H04W 16/14 |
| | | | | 348/180 |
| 2011/0007782 | A1* | 1/2011 | Takahashi | G01S 19/30 |
| | | | | 375/149 |
| 2011/0021167 | A1* | 1/2011 | Shellhammer | H04B 7/0837 |
| | | | | 455/226.1 |
| 2011/0043710 | A1* | 2/2011 | Samarasooriya | H03J 1/0091 |
| | | | | 348/735 |
| 2011/0045781 | A1* | 2/2011 | Shellhammer | H04B 17/0057 |
| | | | | 455/67.11 |
| 2011/0169965 | A1* | 7/2011 | Kim | H04N 17/004 |
| | | | | 348/181 |
| 2011/0280413 | A1* | 11/2011 | Wu | H03J 1/0091 |
| | | | | 381/77 |
| 2013/0225105 | A1* | 8/2013 | Zeng | H04L 27/0006 |
| | | | | 455/226.1 |
| 2014/0307565 | A1* | 10/2014 | Samarasooriya | H04B 1/18 |
| | | | | 370/252 |
| 2015/0189456 | A1* | 7/2015 | Chen | H04K 3/822 |
| | | | | 381/58 |

OTHER PUBLICATIONS

Zeng et al., Covariance Based Signal Detections for Cognitive Radio, 2007, IEEE, p. 203-204.*

Oh et al., TV ehite-space sensing prototype, Dec. 2008, John Wiley and Sons, Ltd., p. 15451564.*

Kim et al., Senstivie White Space Detection with Spectral Covariance Sensing, Sep. 2010, IEEE Transactions on Wireless Communications, p. 2946-2947.*

Balamurthi et al., A TV White Space Spectrum Sensing Prototype, 2011, IEEE International Symposium on Dynamic Spectrum Access Networks, p. 301-303.*

Zeng et al., Covariance based sensing algorithms for detection of DTV and wireless microphone signals, Nov. 2006, IEE, slides 1-10E.*

International Search Report dated Sep. 27, 2012, issued in PCT Application No. PCT/CN2012/075877, filed May 22, 2012.

* cited by examiner

PERIODOGRAM-BASED WIRELESS SIGNAL DETECTION METHOD

TECHNICAL FIELD

The present invention relates to cognition radio technology, and more particularly, to detection of low-power wireless microphone signal in perception of digital TV white space band.

BACKGROUND

The US Federal Communications Committee (FCC) specifies that a device for sensing a TV white space band should be able to detect a wireless microphone signal of signal strength −107 dbm. In case of such low signal strength, narrow-band interference caused by stray radiation, leakage, cross-modulation and the like is similar to the microphone signal. The conventional detection methods cannot distinguish the wireless microphone signal from the narrow-band interference, leading to a high false alarm rate and thus a significant decrease in the number of available TV white space bands.

SUMMARY

The present invention provides a periodogram-based wireless microphone signal detection method which can solve the problem that the conventional wireless microphone signal detection methods cannot distinguish the wireless microphone signal from the narrow-band interference, and thus result in a high false alarm rate. The present invention can provide a great increase in the number of available TV white space bands.

The object of the present invention is achieved with the following solution.

A periodogram-based wireless microphone signal detection method comprises two steps.

Step 1: acquiring a time-domain digital signal to be detected transmitting a signal received at an antenna module to a low-noise amplifier for amplification; applying to the amplified signal a bandpass filter whose passband is adjustable as required; sending the filtered signal to an orthogonal downconverter for performing an orthogonal downconversion on the signal by using a frequency in a selected TV band as a local oscillator (LO) frequency, and thus obtaining two signals including I and Q signals; feeding each of the two signals to a lowpass filtering & gain controller having a certain bandwidth, and then sending the two I and Q signals to an analog-to-digital converter (ADC); sending the two digital signals generated by the ADC to a time-domain signal pre-processing module to perform processing, such as receiving, downsampling, downconversion, IQ integration and storing, on the signal, and then obtaining the time-domain digital signal to be detected.

Step 2: performing detection of microphone signal in frequency-domain applying a spectral scanning on the obtained time-domain digital signal to obtain a frequency to be detected; calculating, with a Fast Fourier Transform (FFT) algorithm, frequency-domain values of M segments of the time-domain signal at the to-be-detected frequency; then calculating an average value of M segments of periodogram of the frequency-domain signal, and preprocessing the average value; applying a circular shift to the preprocessed average by $\lfloor N/2 \rfloor$, denoted as $$\bar{\xi}_e = \left(\xi_e\left[-\frac{N}{2}\right], \xi_e\left[-\frac{N}{2}+1\right], \ldots, \xi_e\left[\frac{N}{2}-1\right], \xi_e\left[\frac{N}{2}\right]\right);$$

estimating a mean value $\bar{\mu}$ and a covariance matrix $\eta$ of a vector $\bar{\xi}_e$ based on a noise variance and a signal-to-noise ratio (SNR) obtained in the preprocessing:

$$\bar{\mu} = (\mu[0], \mu[1], K, \mu[N-1])$$

$$\eta = \begin{bmatrix} \eta[0,0] & 0 & \cdots & 0 \\ 0 & \eta[1,1] & \cdots & 0 \\ \vdots & \vdots & \ddots & \vdots \\ 0 & 0 & \cdots & \eta[N-1,N-1] \end{bmatrix}$$

Where $$\mu[k] = \begin{cases} \sigma^2(N*SNR+1) & (k=0) \\ \sigma^2 & (k=\text{others}) \end{cases}$$

$$\eta[k,k] = \begin{cases} \dfrac{\sigma^4}{M}(2N*SNR+1) & (k=0) \\ \dfrac{\sigma^4}{M} & (k=\text{others}) \end{cases}$$

locating a maximal point or a nearby large-value point $k_0$ from $\bar{\xi}_e$, and taking $k_0$ as a center and obtaining $$P = \left\lfloor \frac{L-1}{2} \right\rfloor$$

points on each side of the center to form a vector $\bar{\mu}_{e,L} = (\xi_e[k_0], \xi_e[k_0-P], \ldots, \xi_e[k_0-1], \xi_e[k_0+1], \ldots, \xi_e[k_0+P])$;
calculating a decision statistical quantity using the Kullback-Leibler (KL) distance in the one-sided decision theory:

$$T_p = (\bar{\mu}_{e,L} - \bar{\mu}_L)^T (\bar{\eta})^{-1} (\bar{\mu}_{e,L} - \bar{\mu}_L)$$

where $\bar{\mu}_L = (\mu[0], \mu[1], \ldots, \mu[L-1])$, and $\bar{\eta}$ is a corresponding sub-matrix of L×L;
simulating or calculating a threshold $\gamma$ in a predefined method, such as simulating the threshold using the Monte Carlo method, or simulating a threshold based on actual data; if $T_p \leq \gamma$, deciding the signal to be narrow-band interference, otherwise deciding the signal to be wireless microphone signal.

The present invention has advantages of solving the problem of incapability of distinguishing wireless microphone signal from narrow-band interference by extracting different features of two signals on a periodogram, and thus addressing a difficult issue in TV white space band detection. The detection method of the present invention is low in algorithm complexity and easy to implement in real systems.

DETAILED DESCRIPTION OF THE EMBODIMENTS

Figure 1:
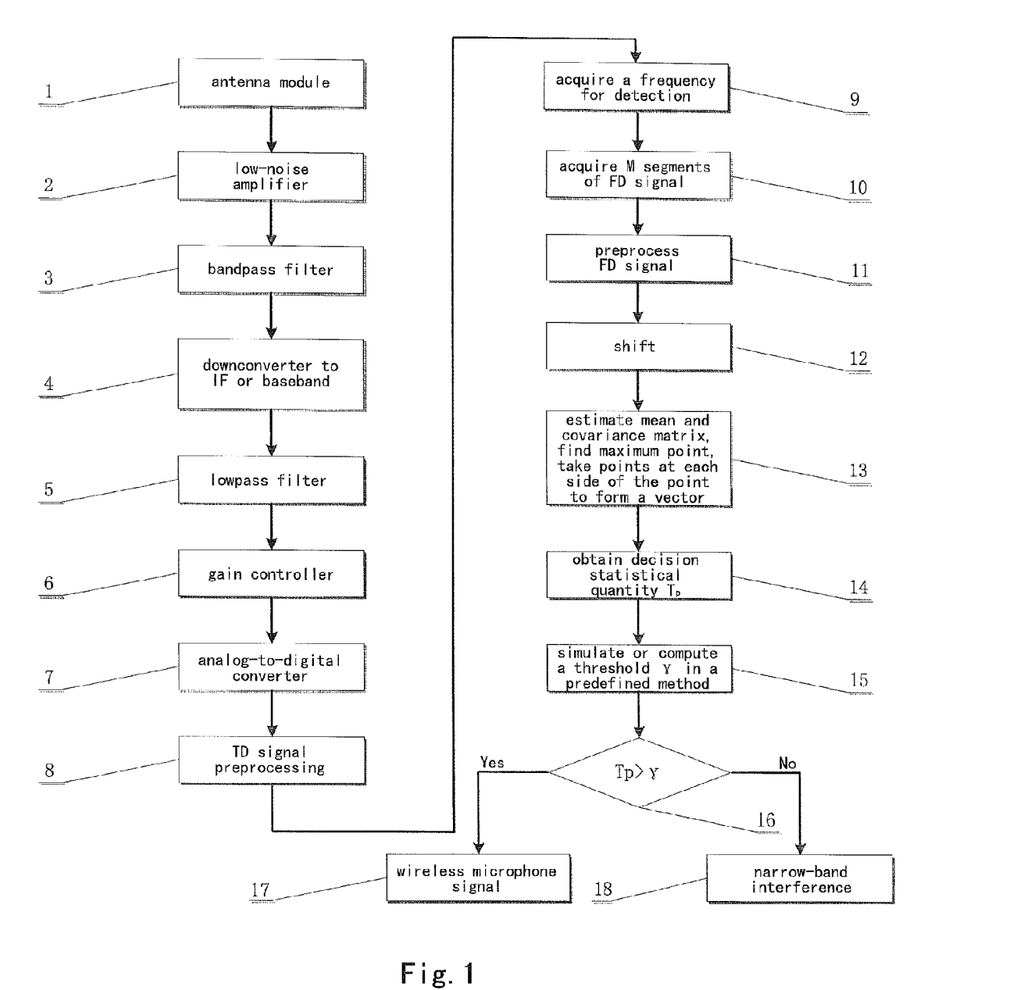
FIG. 1 is a schematic flowchart of a periodogram-based wireless microphone signal detection method according to an embodiment of the present invention.

The embodiments of the present application provide a periodogram-based wireless microphone signal detection method. As shown in FIG. 1, the method includes:

Step 1, receiving an air signal by an antenna module;

Step 2, low-noise amplifying the received signal;

Step 3, passband-filtering the amplified signal;

Step 4, if required, orthogonally down-converting the filtered signal to intermediate frequency or base band;

Step 5, lowpass-filtering the two branches of I and Q signals generated by the orthogonal down-converter;

Step 6, feeding the signals generated by the lowpass filter to a gain controller for gain adjustment;

Step 7, feeding the signals after the gain adjustment to an analog-to-digital converter for analog-to-digital conversion;

Step 8, feeding the digital signals from the analog-to-digital converter to a time-domain signal processing module, and performing, on the signals, processing such as receiving, down-sampling, down-converting, IQ integration and storing, to obtain non-overlapped or partially overlapped M segments of time-domain digital signal for detection;

Step 9, spectral-scanning the time-domain digital signal obtained in step 8 to acquire a frequency to be detected;

Step 10, transforming, into a frequency-domain signal, the non-overlapped or partially overlapped M segments of time-domain digital signal for detection at the to-be-detected frequency by using Discrete Fourier Transform (DFT) or Fast Fourier Transform (FFT);

Step 11, calculating M segments of periodogram of the frequency-domain signal for detection, averaging the M segments of periodogram, preprocessing the average value to remove frequency deviation, and estimating the required noise variance and signal-to-noise ratio;

Step 12, shifting the preprocessed average value of the periodogram, and forming a shifted vector;

Step 13, estimating a mean and a covariance matrix of the shifted vector based on the noise variance and the signal-to-noise ratio obtained in step 11, M, and a length of the frequency-domain signal, locating the maximum point or a nearby large-value point in the shifted vector, and taking several points at each side of the located point as a center to form an information vector;

Step 14, calculating a decision statistical quantity $T_p$ using the decision theory;

Step 15, simulating or calculating a threshold γ in a predefined method;

Step 16, deciding, based on a comparison of $T_p$ and γ, that the signal is narrow-band interference if $T_p \leq \gamma$, otherwise the signal is wireless microphone signal.

The method of the present embodiment can correctly distinguish wireless microphone signal from narrow-band interference using their different characteristics in periodogram, and thus accurately detect whether there is wireless microphone signal in a channel under sensing. In the method, a signal received at an antenna module 101 is first transmitted to a low-noise amplifier (LNA) 102 for amplification. The amplified signal is applied to a bandpass filter (BPF) 103 whose passband is adjustable as required. Then, the filtered signal is sent to an orthogonal downconverter 105 for performing an orthogonal downconversion on the signal by using a frequency in a selected TV band as a local oscillator 104 frequency, and thus obtaining two branches of I and Q signals. Each of the two branches of signals is fed to a lowpass filter (LPF) 106 having a certain bandwidth as well as an intermediate-frequency amplifier (IF Amp) 107. The generated I and Q signals are fed to an analog-to-digital converter (ADC) 109. The two digital signals generated by the ADC 109 is sent to FPGA 110 to perform processing, such as receiving, downsampling, downconversion, IQ integration and storing, on the signal, thereby obtaining the time-domain digital signal to be detected. The obtained time-domain digital signal is subjected to spectral scanning to obtain a frequency for detection. Then, a binary hypothetical model may be established by simulating narrow-band interference with a sine continuous wave signal:

$$H_1 \text{ (wireless microphone signal)}: x[n] = \frac{A}{2} e^{j\left(2\pi\beta \int_0^{nT_s} m(\tau)d\tau + \varphi\right)} + \omega[n] \quad (1)$$

$$H_0 \text{ (sine continuous wave signal)}: x[n] = \frac{A}{2} e^{j\varphi} + \omega[n] \quad (2)$$

where $T_s=1/f_s$, A is signal amplitude, β is a modulation factor of the microphone signal, φ is a random phase angle, m(t) includes information carried by the wireless microphone signal and band-limited complex Gaussian white noise ω[n] having a variance $\sigma^2$.

In a real system, there is a frequency deviation, denoted as $\Delta f = f_c - \overline{f}_c$, in each of a signal carrier frequency $f_c$ and a downconversion frequency $\overline{f}_c$. Therefore, the digital signal x[n] will be subjected to a preprocessing for removing the frequency deviation prior to periodogram comparison. In this way, better effect can be achieved. The statistical characteristics of the periodogram of the sine continuous wave signal are derived as:

$$\text{Mean: } E\{\xi[k]\} = \sigma^2 \left[\frac{SNR}{N} sad^2(\pi\zeta[k], N) + 1\right] \quad (3)$$

$$\text{Variance: } V\{\xi[k]\} = \sigma^4 \left[\frac{2SNR}{N} sad^2(\pi\zeta[k], N) + 1\right] \quad (4)$$

where ξ[k] is the periodogram of x[n], sad(πζ[k], $$N) = \frac{\sin(\pi\zeta[k]N)}{\sin(\pi\zeta[k])}, \zeta[k] = \frac{\Delta f}{f_s} - \frac{k}{N},$$

the signal-to-noise ratio is $$SNR = \frac{A^2}{4\sigma^2},$$

and N is the length of x[n]. The signal preprocessing algorithm is as follows.

Step 21, successively collecting non-overlapped or partially overlapped M segments of the signal (each segment is of a length N), and calculating an average value of the periodogram of the M signal segments as $\overline{\xi}_a=(\xi_a[0], \xi_a[1], \ldots, \xi_a[N-1])$;

Step 22, estimating the noise variance $\sigma^2$, and finding the largest element $\xi_a[k_1]$ and the next largest element $\xi_a[k_2]$ in $\overline{\xi}_a$, $k_1 < k_2$. $\xi_a[k_1]$ and $\xi_a[k_2]$ are substituted, as mean values, into Equation (3), and thus result in:

$$\frac{\xi_a[k_1]}{\sigma^2} - 1 = \frac{SNR}{N} sad^2(\pi\zeta[k_1], N) \quad (5)$$

$$\frac{\xi_a[k_2]}{\sigma^2} - 1 = \frac{SNR}{N} sad^2(\pi\zeta[k_2], N) \quad (6)$$

It can be obtained from Equations (5) and (6):

$$\left[\frac{sad(\pi\zeta[k_1], N)}{sad(\pi\zeta[k_2], N)}\right]^2 = \frac{\xi_a[k_1] - \sigma^2}{\xi_a[k_2] - \sigma^2} \triangleq C \quad (7)$$

The frequency deviation $\Delta f$ can be calculated with Equation (7). Therefore, it is possible to remove the frequency deviation and also obtain the average value of the periodogram without the frequency deviation.

Step 23, the frequency deviation $\Delta f$ calculated at step 22 is substituted into Equation (5) to estimate the signal SNR.

The following methods may be used to estimate the noise variance in step 22:
a) measuring with an equipment (e.g., a spectrum analyzer), i.e., selecting a segment of band including only noise, and measuring a power of the noise;
b) selecting a segment of band including only noise based on the obtained periodogram, and estimating a power of the noise in a method such as a method of taking a median or mean.

The following methods may be used to estimate the signal-to-noise ratio in step 23:
a) measuring an overall power of signal and noise for a certain bandwidth with an equipment (e.g., a spectrum analyzer), and measuring a power of the noise to estimate the signal-to-noise ratio;
b) selecting a segment of band including only noise based on the obtained periodogram, and estimating a power of the noise in a method such as a method of taking a median or mean; and then estimating an overall power of the signal for a certain bandwidth using a similar method to estimate the signal-to-noise ratio.

The average value of periodogram of the M signal segments are obtained with the frequency deviation being removed, after the preprocessing of the collected data. On this premise, the periodogram-based wireless microphone signal detection method may include the following steps.

Step 31, applying a circular shift, by $\lfloor N/2 \rfloor$, to the average value of the periodogram of the M signal segments after the removal of frequency deviation, denoted as $$\overline{\xi}_e = \left(\xi_e\left[-\frac{N}{2}\right], \xi_e\left[-\frac{N}{2}+1\right], \ldots, \xi_e\left[\frac{N}{2}-1\right], \xi_e\left[\frac{N}{2}\right]\right);$$

Step 32, estimating a mean value $\overline{\mu}$ and a covariance matrix $\eta$ of a vector $\overline{\xi}_e$ based on the noise variance and signal-to-noise ratio obtained in the preprocessing:

$$\overline{\mu} = (\mu[0], \mu[1], K, \mu[N-1]) \quad (8)$$

$$\eta = \begin{bmatrix} \eta[0,0] & 0 & \cdots & 0 \\ 0 & \eta[1,1] & \cdots & 0 \\ \vdots & \vdots & \ddots & \vdots \\ 0 & 0 & \cdots & \eta[N-1,N-1] \end{bmatrix} \quad (9)$$

where $$\mu[k] = \begin{cases} \sigma^2(N * SNR + 1) & (k = 0) \\ \sigma^2 & (k = \text{others}) \end{cases} \quad (10)$$

$$\eta[k,k] = \begin{cases} \frac{\sigma^4}{M}(2N * SNR + 1) & (k = 0) \\ \frac{\sigma^4}{M} & (k = \text{others}) \end{cases} \quad (11)$$

Step 33, locating a maximal point or a nearby large-value point $k_0$ from $\overline{\xi}_e$, and taking $k_0$ as a center and obtaining $$P = \left\lfloor \frac{L-1}{2} \right\rfloor \left(L \leq \frac{N}{2}\right)$$

points on each side of the center to form an information vector $\overline{\mu}_{e,L} = (\xi_e[k_0], \xi_e[k_0-P], \ldots, \xi_e[k_0-1], \xi_e[k_0+1], \ldots, \xi_e[k_0+P])$;

Step 34, calculating a decision statistical quantity using the KL distance in the one-sided decision theory:

$$T_p = (\overline{\mu}_{e,L} - \overline{\mu}_L)^T (\overline{\eta})^{-1} (\overline{\mu}_{e,L} - \overline{\mu}_L) \quad (12)$$

where $\overline{\mu}_L = (\mu[0], \mu[1], \ldots, \mu[L-1])$, and $\overline{\eta}$ is a corresponding sub-matrix of L×L;

Step 35, with a given false alarm rate ($P_{FA}$), simulating a threshold $\gamma$ using the Monte Carlo method or setting a threshold $\gamma$ based on actual data, and deciding according to a criterion: if $T_p \leq \gamma$, the signal is narrow-band interference ($H_0$), otherwise the signal is wireless microphone signal ($H_1$).

Some specific embodiments of the present invention will be described in connection with the accompany figures to illustrate the principle and function of the method of the present invention.

Embodiment 1

The present embodiment illustrates a system simulation of the periodogram-based wireless microphone signal detection method. The simulation is carried out in the MATLAB environment, and includes the following steps:
1) generating a sine continuous wave signal and a frequency-modulated (FM) wireless microphone signal, and obtaining a baseband discrete temporal signal x[n] through downconversion, lowpass filtering and downsampling;
2) setting performance parameters such as a signal-to-noise ratio SNR, a frequency modulation factor $\beta$, and a length L of a window for computing $T_p$;
3) processing the signal using preprocessing and detection algorithms;
4) plotting performance graphs with different parameters.

Figure 2:
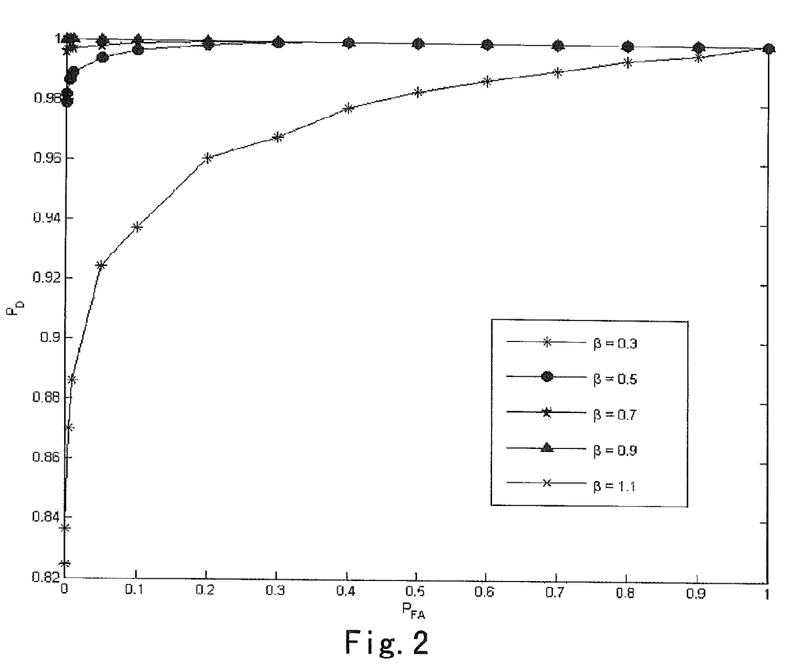
FIG. 2 is ROC performance graph of the periodogram-based detection method with different β when L=11, SNR=−17 dB in Embodiment 1 of the present invention.
Figure 3:
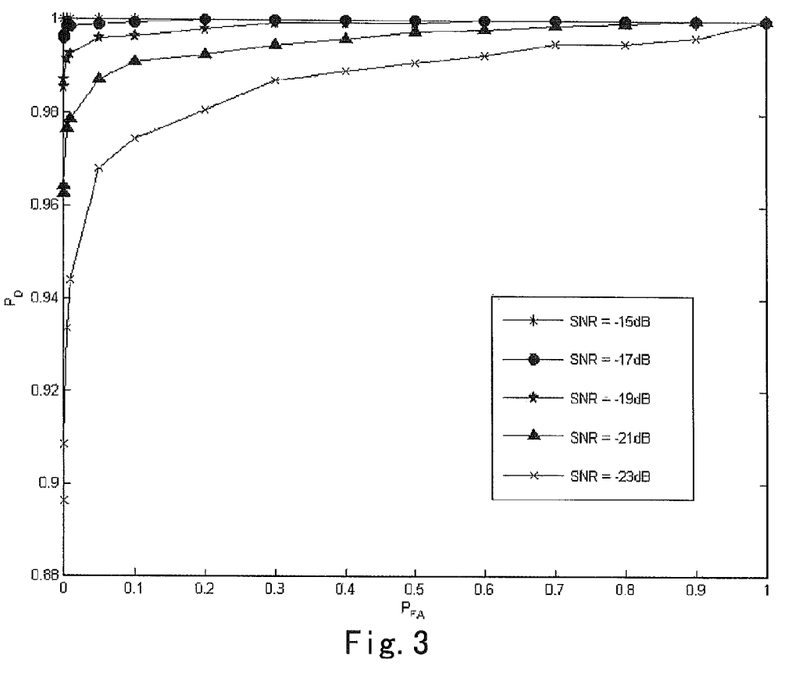
FIG. 3 is ROC performance graph of the periodogram-based detection method with different SNR when L=11, β=0.7 in Embodiment 1 of the present invention.
Figure 4:
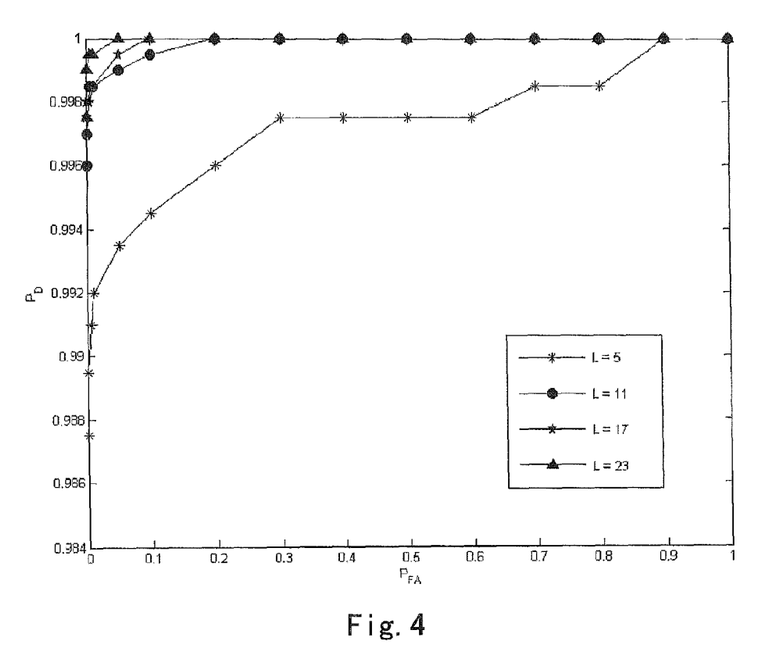
FIG. 4 is ROC performance graph of the periodogram-based detection method with different L when β=0.7, SNR=−17 dB in Embodiment 1 of the present invention.

FIGS. 2, 3 and 4 are performance graphs obtained in the simulation. As shown in the figures, for a wireless microphone signal having β=0.7, the detection rate ($P_D$) can still reach 98% even with a SNR=−21 dB when L=11 and the false alarm rate ($P_{FA}$) is set as less than 1%. After β is increased to β≤0.9, any wireless microphone signal can be substantially detected in a condition of extremely low complexity (as long as L=11) and a $P_{FA}$ less than 1%.

Embodiment 2

Figure 5:
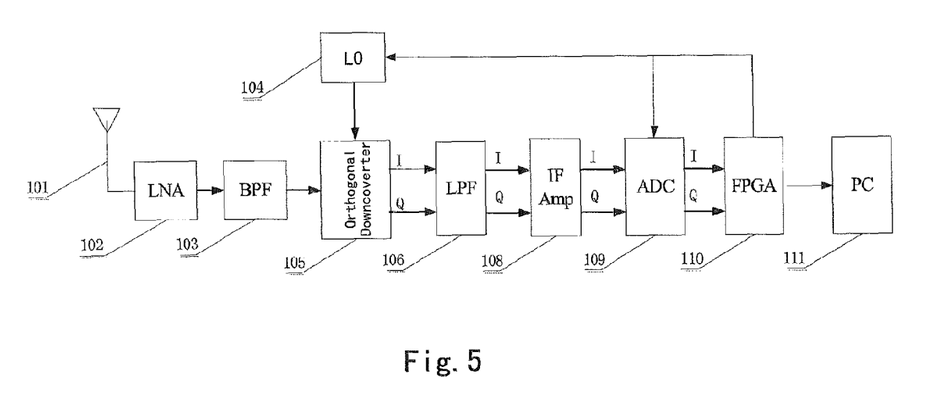
FIG. 5 is a schematic diagram of a real system architecture 1 for a periodogram-based wireless microphone signal detection method according to Embodiment 2 of the present invention.
Figure 6:
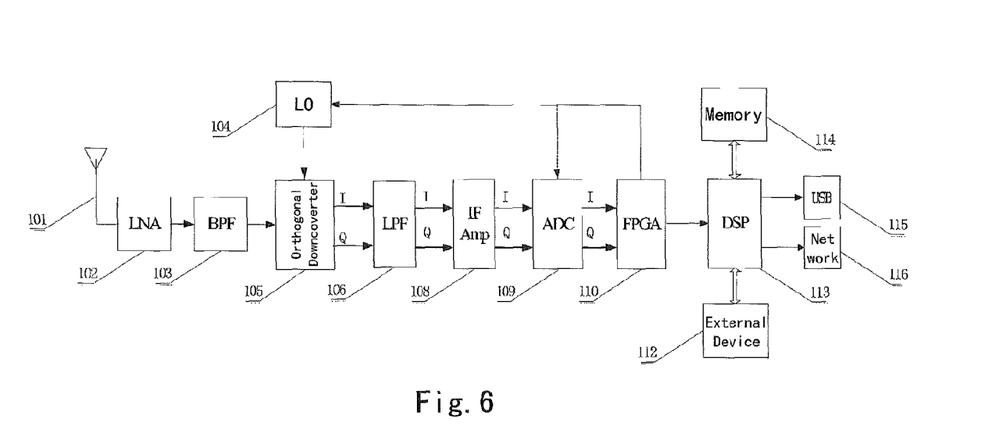
FIG. 6 is a schematic diagram of a real system architecture 2 for a periodogram-based wireless microphone signal detection method according to Embodiment 2 of the present invention.

The present embodiment illustrates a real system implementation of the periodogram-based wireless microphone signal detection method. The architecture of the real system is shown in FIG. 5. A signal received at an antenna module 101 is first transmitted to a low-noise amplifier (LNA) 102 for amplification. The amplified signal is applied to a bandpass filter (BPF) 103 whose passband is adjustable as required. Then, the filtered signal is sent to an orthogonal downconverter 105 for performing an orthogonal downconversion on the signal by using a frequency in a selected TV band as a local oscillator 104 frequency, and thus obtaining two branches of I and Q signals. Each of the two branches of signals is fed to a lowpass filter (LPF) 106 having a certain bandwidth as well as an intermediate-frequency amplifier (IF Amp) 107. The generated I and Q signals are fed to an analog-to-digital converter (ADC) 109. The two digital signals generated by the ADC 109 is sent to FPGA 110 to perform processing, such as receiving, downsampling, downconversion, IQ integration and storing, on the signal, thereby obtaining the time-domain digital signal to be detected. The data are transmitted a PC 111 via an interface such as USB, and applied to a frequency-domain microphone detection algorithm in PC 111. Finally, judgment is made about the status of the sensed TV band based on a decision result. Different downconversion frequencies and sampling rates may be controlled via a feedback circuit from FPGA to the local oscillator and ADC. The system architecture 2 as shown in FIG. 6 may also be used, in which the PC 111 in the architecture 1 is replaced with a module having a core of DSP 113. The module sends the data from FPGA 110 to a data memory 114 via a corresponding interface such as EMIF. The DSP 113 reads the data from the memory 114, performs the frequency-domain microphone detection algorithm, and provides the decision result in real time. The decision result may be provided to an external device 112 coupled to the DSP, or transmitted to some other device via some interface such as USB 115, a network interface 116.

The real algorithm test steps based on the architecture 1 include:
1) selecting some TV band, and generating a microphone signal and a sine continuous wave signal at different frequencies respectively by using a wireless microphone signal generator and a signal generator;
2) collecting the signals by the system of the architecture as shown in FIG. 5, that is, successively collecting M segments of time-domain digital signal, each segment having a duration of t millisecond;
3) processing the obtained data in PC by using the frequency-domain microphone detection algorithm.

The real algorithm test steps based on the architecture 1 include:
1) selecting some TV band, and generating a microphone signal and a sine continuous wave signal at different frequencies respectively by using a wireless microphone signal generator and a signal generator;
2) collecting the signals by the system of the architecture as shown in FIG. 6, that is, successively collecting M segments of time-domain digital signal, each segment having a duration of t millisecond;
3) processing the obtained data in DSP chip by using the frequency-domain microphone detection algorithm.

Figure 7:
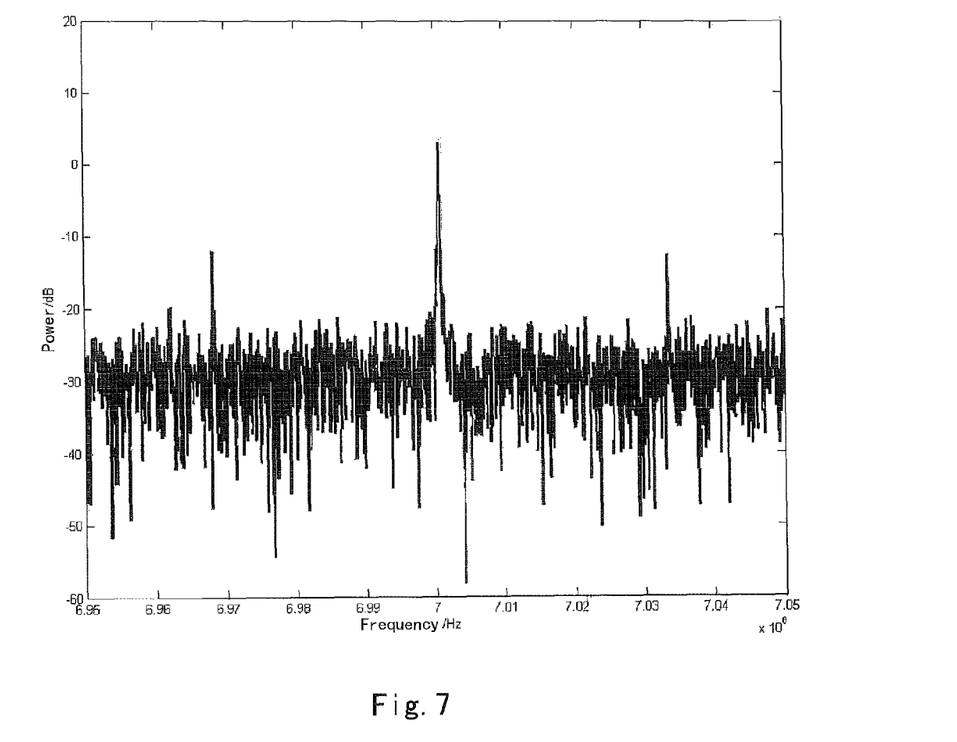
FIG. 7 is a power spectral graph of a wireless microphone signal from Sennheiser company for test according to the present invention, where the microphone is placed in an acoustic environment, and the signal strength is about −95 dbm.
Figure 8:
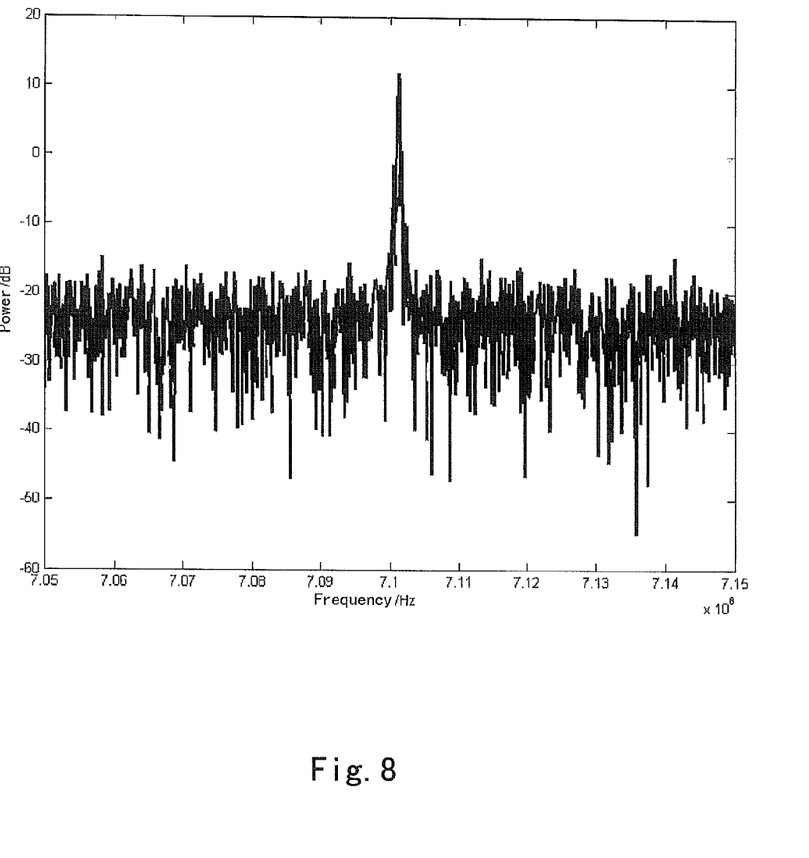
FIG. 8 is a power spectral graph of a wireless microphone signal from Shure company for test according to the present invention, where the microphone is placed in an acoustic environment, and the signal strength is about −90 dbm.

In the experiments, distinguishing between wireless microphone signal and narrow-band interference is tested, respectively, in acoustic and silent environments at different powers and different types. FIGS. 7 and 8 are power spectrum graphs of the wireless microphone signal obtained in two test environments. The experimental results are substantially the same as the system simulation results.

The solutions of the embodiments of the present invention can solve the problem of incapability of distinguishing wireless microphone signal from narrow-band interference by extracting different features of two signals on a periodogram, and thus addressing a difficult issue in TV white space band detection. The detection method of the present invention is low in algorithm complexity and easy to implement in real systems.

The embodiments of the present invention further provide a periodogram-based wireless microphone signal detection device including an antenna module, a low-noise amplifier, a bandpass filter, a downconverter module for down-converting to intermediate frequency or baseband, a lowpass filter, a gain controller, an analog-to-digital converter, and a time-domain signal preprocessing module, characterized in that, a signal output of the antenna module is coupled to a signal input of the low-noise amplifier, a signal output of the low-noise amplifier is coupled to a signal input of the bandpass filter, a signal output of the bandpass filter is coupled to a signal input of the downconverter module, a signal output of the downconverter module is coupled to a signal input of the lowpass filter, a signal output of the lowpass filter is coupled to a signal input of the gain controller, a signal output of the gain controller is coupled to the signal input of the analog-to-digital converter, and a signal output of the analog-to-digital converter is coupled to a signal input of the time-domain signal preprocessing module.

Alternatively, the antenna module comprises Very-High Frequency and Ultra-High Frequency receive antennas, and the downconverter module for down-converting to intermediate frequency or baseband is configured to set a local oscillator frequency based on a TV band for detection, and down-converting the signal to intermediate frequency or baseband using an orthogonal downconverter.

Alternatively, the lowpass filter has a bandwidth equal to or wider than a half of a bandwidth of one TV band; the gain controller is configured to output a voltage or current value that is adjustable manually or automatically according to a voltage or current required by the analog-to-digital converter; and the time-domain signal preprocessing module is configured to implement, with a programmable chip or software, two functions of 1) performing processing on two branches of I and Q signals, such as receiving, down-sampling, down-converting, integrating and storing the signals, and 2) providing control signals required by the other modules, such as the local oscillator, the analog-to-digital converter, and USB chip.

The functions of the respective components in the above periodogram-based wireless microphone signal detection device have been specifically described in the foregoing method embodiments, and thus details thereof will be omitted here.

While the preferred embodiments of the present invention have been described, the present invention is not limited to thereto. Any variant or substitution easily envisioned by those skilled in the art within the concept of the present invention should fall into the scope of the present disclosure. The scope of the present invention is defined by the claims.

What is claimed is:

1. A periodogram-based wireless microphone signal detection method implemented in a computer, comprising:
acquiring M segments of frequency-domain signal, obtaining a shifted vector by preprocessing and shifting the frequency-domain signal, estimating a mean and a covariance matrix of the shifted vector, locating a maximum point or a nearby large-value point of the vector, and taking several points on each side of the point as a center to form an information vector $\bar{\mu}$;
calculating a decision statistical quantity $T_p$ of the information vector $\bar{\mu}$, simulating or calculating a threshold $\gamma$ in a predefined method, and deciding whether the acquired M segments of frequency-domain signal are wireless microphone signal based on a comparison between the decision statistical quantity $T_p$ and the threshold $\gamma$ to reduce high false alarm rates in distinguishing between wireless microphone signals and noise in a TV band white space.

2. The method of claim 1, wherein said acquiring M segments of frequency signal comprises converting non-overlapped or partially-overlapped M segments of time-domain signal into frequency-domain signal for detection by using Discrete Fourier Transform or Fast Fourier Transform algorithm.

3. The method of claim 1, wherein said preprocessing the frequency-domain signal comprises calculating a periodogram of the M segments of frequency-domain signal for detection, averaging the M segments of periodogram, and preprocessing an average value to remove frequency deviation;
said preprocessing the average value to remove frequency deviation comprises:
step 1, estimating a noise variance using the average value of the M segments of periodogram, and locating two greatest elements in the average value;
step 2, substituting the two greatest elements obtained in step 1 into a theoretical mean expression to obtain a frequency deviation of the signals for detection;
step 3, substituting the estimated frequency deviation obtained in step 2 into the theoretical mean expression to estimate a signal-to-noise ratio of the signals for detection.

4. The method of claim 3, wherein said estimating a noise variance $\sigma^2$ in the preprocessing of frequency deviation removal comprises:
selecting a segment of band including only noise, and measuring a power of the noise; or
selecting a segment of band including only noise based on the obtained periodogram, and estimating a power of the noise in a method such as a method of taking a median or mean.

5. The method of claim 3, wherein said estimating a signal-to-noise ratio in the preprocessing of frequency deviation removal comprises:
measuring an overall power of signal and noise for a certain bandwidth with an equipment, and measuring a power of the noise to estimate the signal-to-noise ratio; or
selecting a segment of band including only noise based on the obtained periodogram, and estimating a power of the noise in a method such as a method of taking a median or mean; and then estimating an overall power of the signal for a certain bandwidth using a similar method to estimate the signal-to-noise ratio.

6. The method of claim 1, wherein said shifting comprises shifting an average value of a preprocessed periodogram and forming a shifted vector; calculating a mean and a covariance matrix of the shifted vector based on estimation of noise variance and signal-to-noise ratio, M, and a length of frequency-domain signal samples; and locating a maximum point or a nearby large-value point of the shifted vector, and taking several points on each side of the point as a center to form the information vector.

7. The method of claim 1, wherein said calculating a decision statistical quantity comprises calculating the decision statistical quantity $T_p$ with a decision theory, simulating or calculating the threshold $\gamma$ in a predefined method, and deciding, based on a comparison between $T_p$ and $\gamma$, that the frequency-domain signals are narrow-band interference if $T_p \leq \gamma$, otherwise they are wireless microphone signals.

8. A periodogram-based wireless microphone signal detection device comprising an antenna module, a low-noise amplifier, a bandpass filter, a downconverter for down-converting to intermediate frequency or baseband, a lowpass filter, a gain controller, an analog-to-digital converter, and a time-domain signal preprocessing module, wherein a signal output of the antenna module is coupled to a signal input of the low-noise amplifier, a signal output of the low-noise amplifier is coupled to a signal input of the bandpass filter, a signal output of the bandpass filter is coupled to a signal input of the downconverter, a signal output of the downconverter is coupled to a signal input of the lowpass filter, a signal output of the lowpass filter is coupled to a signal input of the gain controller, a signal output of the gain controller is coupled to the signal input of the analog-to-digital converter, and a signal output of the analog-to-digital converter is coupled to a signal input of the time-domain signal preprocessing module:
wherein said lowpass filter has a bandwidth equal to or wider than a half of a bandwidth of one TV band; said gain controller is configured to output a voltage or current value that is adjustable manually or automatically according to a voltage or current required by the analog-to-digital converter; and said time-domain signal preprocessing module is configured to implement, with a programmable chip or software, two functions of 1) performing processing on two branches of I and Q signals, and 2) providing control signals required by another module, and
said performing processing on two branches of I and Q signals comprises receiving, down-sampling, down-converting, integrating and storing the I and Q signals.

9. The device of claim 8, wherein said antenna module comprises Very-High Frequency and Ultra-High Frequency receive antennas, and the downconverter is configured to set a local oscillator frequency based on a TV band for detection, and down-converting the signal to intermediate frequency or baseband using an orthogonal downconverter.

10. The method of claim 5, wherein the equipment comprises a spectrum analyzer.

11. The device of claim 8, wherein the other module comprises one or more of a local oscillator, the analog-to-digital converter, and a USB chip.

* * * * *